United States Patent [19]
Ghaderi

[11] Patent Number: 5,481,628
[45] Date of Patent: Jan. 2, 1996

[54] METHOD AND APPARATUS FOR SPATIALLY VARIANT FILTERING

[75] Inventor: Mohsen Ghaderi, Rochester, N.Y.

[73] Assignee: Eastman Kodak Company, Rochester, N.Y.

[21] Appl. No.: 28,474

[22] Filed: Mar. 9, 1993

Related U.S. Application Data

[63] Continuation-in-part of Ser. No. 757,091, Sep. 10, 1991, abandoned.

[51] Int. Cl.⁶ ........................................... G06K 9/40
[52] U.S. Cl. ................... 382/261; 382/263; 382/272
[58] Field of Search ................... 382/54, 41, 1, 382/52; 358/455, 458, 402, 403

[56] References Cited

U.S. PATENT DOCUMENTS

| | | | |
|---|---|---|---|
| 4,571,635 | 2/1986 | Mahmoodi et al. | 382/54 |
| 4,577,235 | 3/1986 | Kannapell et al. | 382/52 |
| 4,825,297 | 4/1989 | Fuchsberger et al. | 358/447 |
| 4,941,190 | 7/1990 | Joyce | 382/54 |
| 5,038,388 | 8/1991 | Song | 382/54 |
| 5,081,692 | 1/1992 | Kwon | 382/54 |
| 5,231,677 | 1/1993 | Mita et al. | 382/54 |

*Primary Examiner*—Leo H. Boudreau
*Assistant Examiner*—David R. Anderson
*Attorney, Agent, or Firm*—Peyton C. Watkins

[57] ABSTRACT

An adaptive spatial filter for digital image processing selectively performs spatial high pass filtering of an input digital signal to produce an output pixel value having an enhanced signal level using a gain factor that effects a variable degree of enhancement of the input pixel, so that pixels whose activity values are close to an iteratively adjustable activity threshold level will be emphasized significantly less than pixels whose associated activity values are substantially above the threshold level. The activity threshold level is selectively updated at the end of a scan line in accordance with prescribed spatial activity criteria, so as to effectively prevent discontinuities in the threshold level during line-by-line adjustment and to take into account how 'noisy' the background is. Potential corruption of the updated value of a pixel by an edge portion of the image is avoided by requiring that pixels which are associated with background or signal regions of the image be respectively less than or greater than a local mean value. Otherwise the pixel values are not modified.

21 Claims, 8 Drawing Sheets

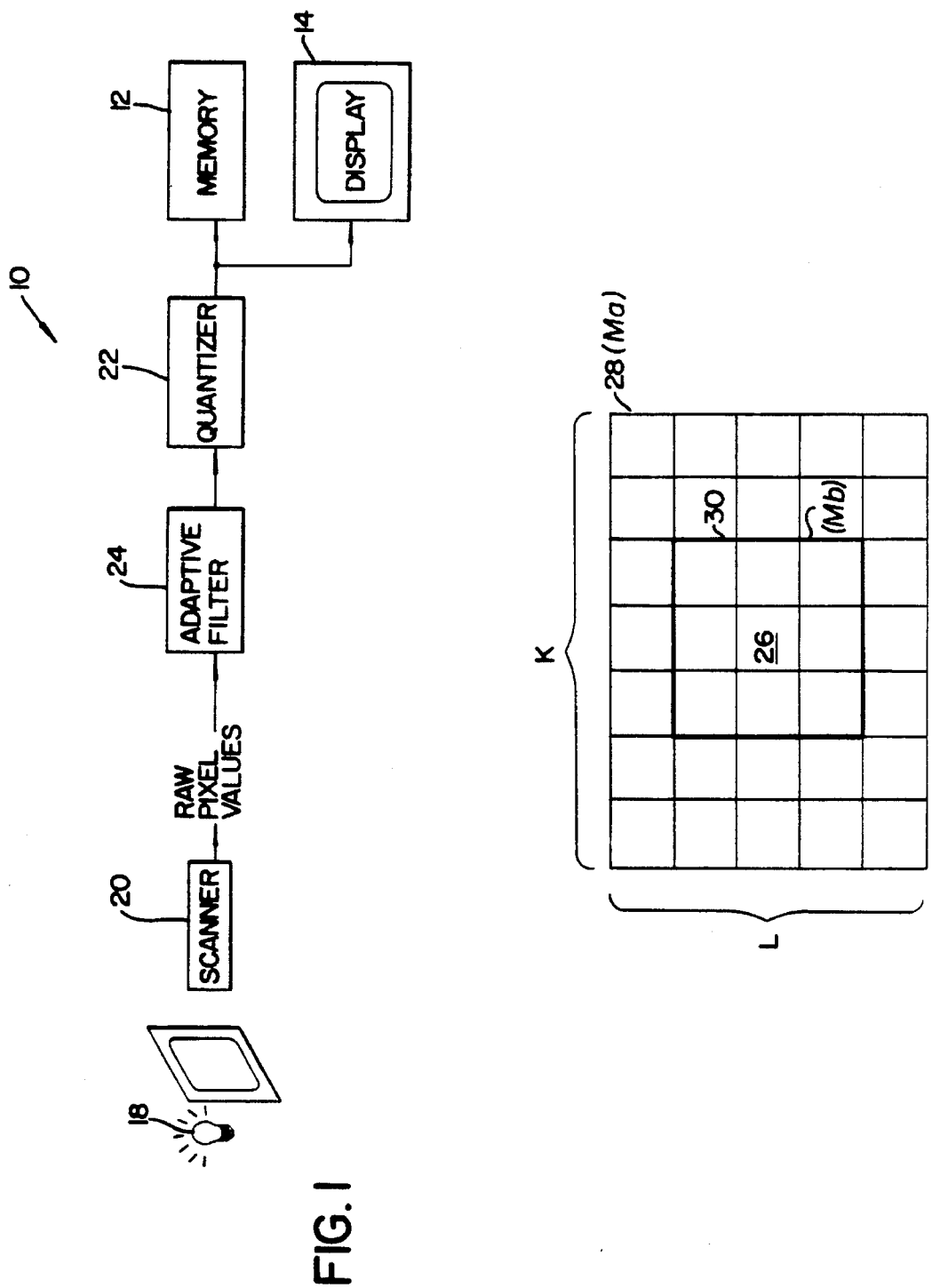

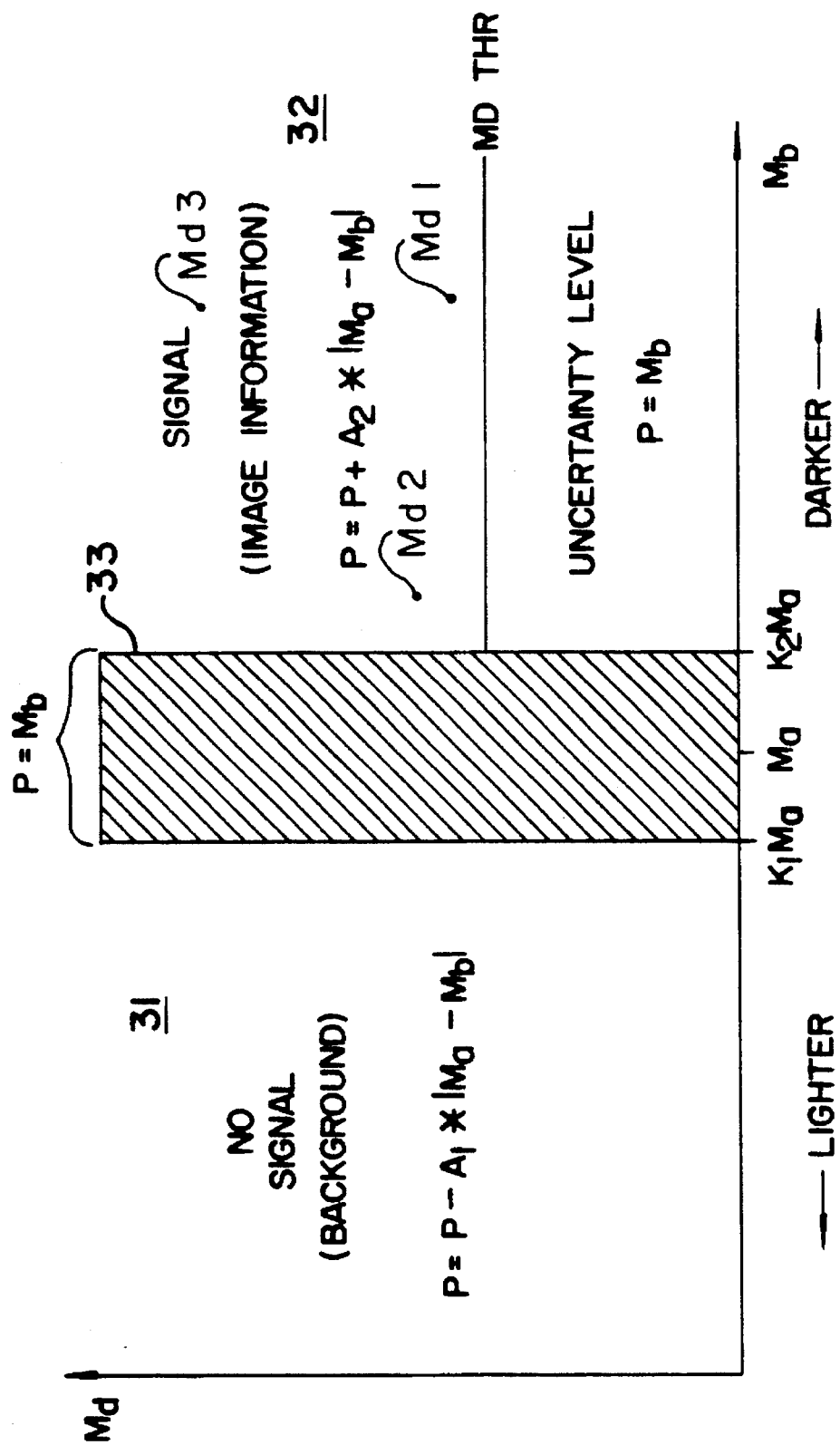

METHOD AND APPARATUS FOR SPATIALLY VARIANT FILTERING

CROSS-REFERENCE TO RELATED APPLICATIONS

The present application is a continuation-in-part of U.S. patent application Ser. No. 757,091, filed Sep. 10, 1991, now abandoned, entitled "Method and Apparatus for Spatially Variant Filtering," by Mohsen Ghaderi, assigned to the assignee of the present application and the disclosure of which is herein incorporated.

FIELD OF THE INVENTION

The present invention relates in general to digital image processing and is particularly directed to an enhancement of the adaptive filter described in the above-referenced copending '091 application, now abandoned, specifically a mechanism for refining the gain factor employed to define the value of pixel that has been classified as an image signal, and for updating the value of an adaptive activity threshold level through which pixel values are classified as signal pixels.

BACKGROUND OF THE INVENTION

My above-referenced U.S. patent application Ser. No. 757,091, filed Sep. 10, 1991, now abandoned, entitled "Method and Apparatus for Spatially Variant Filtering," describes a selective/adaptive filtering mechanism, which is based upon image activity within spatial windows surrounding pixels of an image to be processed, as a new and improved solution of (texture) image spatial filtering which remedies the problem of prior art approaches, which exclusively use either low-pass spatial filtering or high-pass spatial filtering.

As pointed out in that application, although the prior art techniques of using only low-pass filtering to reduce differences between individual pixel values and the general pixel-value levels in their neighborhoods tends to reduce the effects of noise and the visibility of "jaggies" that result from spatial quantization, it also undesirably tends to blur images and thus reduce the sharpness that is more desirable for textual-type images. High-pass filtering, on the other hand, operates to increase differences between a pixel value and the general level in its surrounding neighborhood. While this tends to lend desirable sharpness to textual images, it also amplifies noise and thereby makes "snow" in solid areas more noticeable.

In accordance with the selective/adaptive filtering scheme described in my above-identified '091 application, now abandoned, the type of filtering to be employed is not limited to only lowpass or only highpass processing. It is adaptively dependent upon the level of variation in the image. Pursuant to my selective, adaptive filtering approach, a variation window is associated with each pixel, and the variation in input pixel values associated with the pixels in that variation window is computed. For each of a plurality of pixels in the image, a 'selective' filtering process choice is made between performing and refraining from performing one of a high-pass and a low-pass operation. The process choice depends upon the variation computed for that pixel. Then, in accordance with the process choice, pixel output values are generated by performing high-pass or low-pass filtering on some of the input pixel values but not performing it on others. This selective high-pass, low-pass filtering has been found to greatly enhance the readability of the processed image.

FIG. 1 diagrammatically illustrates depicts a digital image processing system as described in the above-referenced '091 application for recording in a memory 12 or displaying on a display device 14 the contents of an image source such as a microfilm strip 16. Microfilm strip 16 may be illuminated by a light source 18 and the illuminated image scanned by a digitizing scanner 20. Scanner 20 includes circuitry that treats the resultant image as being divided into a plurality or array of pixels, and it generates digital image signals representing digitized values of those pixels as 'raw pixel-value' digital input signals for application to downstream digital image processing components, including an adaptive filter 24 and a quantizer 22, prior to storage or display. Display device 14 may comprise one of a number of display device types, such as a cathode-ray tube or image-applying machinery contained in a photocopier.

In accordance with the invention described in the '091 application, now abandoned, adaptive filter 24 is operative to selectively perform one of high-pass and low-pass spatial filtering on respective pixels of the digitized image prior to quantizing. In order to determine which type of filtering is to be selectively used, the respective pixels of the digitized image are initially classified in accordance with their relative values and the value variations in surrounding neighborhoods.

More specifically, with reference to FIG. 2, associated with each pixel in the digitized image, such as the central pixel 26, are two surrounding neighborhoods or 'windows' of pixels. A first, larger window 28 is preferably sized to be about half the extent of the significant part of the imaging system's point-source function, i.e., of the light-intensity function that results from a single point source in the plane of the microfilm. The contents of this larger window are used to establish an average value Ma of the values of all pixels within the window. Although this average may be a weighted average in which the pixels closer to the central pixel 26 are weighted more heavily, a straight average, in which all pixels are equally weighted, is preferred. This average value Ma is employed as a threshold between those pixel values that are considered to be background and those pixel values that are considered to convey signal (character) information, as will be described.

To determine whether the pixel 26 is within a background region or is within a signal region, the large-window neighborhood average Ma is compared with a local average Mb computed over a second, smaller window 30 surrounding pixel 26. Window 30 may be of any smaller size; in principle, in fact, it can be so small as to include only pixel 26. For noise-suppression purposes, however, window 30 preferably contains a plurality of pixels.

In addition to large window average Ma and smaller window, or local, average Mb, two further parameters are employed to classify a pixel. One of these is an "activity level" parameter Md, which is a measure of the variation in pixel value in a window around the +pixel 26 under consideration. For the sake of convenience, the larger window 28 that is used to compute Ma is employed to calculate Md. However, such a choice is not necessary.

The variation or activity level Md may be computed in any number of ways, such as standard deviation or absolute mean. In the preferred embodiment, the absolute mean deviation, defined as follow is employed:

$$M_d = \frac{1}{KL} \sum_{i=y}^{Y+L-1} \sum_{j=x}^{x+K-1} |P_{ij} - M_w|, \quad (1)$$

where Pij is the value of the jth pixel in the ith row, K and L are the width and height, respectively, of the window over which the variation is computed, Mw is an average pixel value in that window (and is equal to Ma in the illustrated embodiment), and the upper-left-corner pixel in that window is the xth pixel in the yth row.

Which filter operation is to be performed by adaptive filter 24 is determined by: 1) comparing the small-window average Mb with the large-window average Ma; and 2) comparing the activity level Md with an 'activity threshold value' MD_THR, which is intended to approximate the general variation level in the image as a whole. The manner in which MD_THR is determined is described in detail below.

FIG. 3 depicts the manner in which the four parameters Ma, Mb, Md and MD_THR are employed to classify an input pixel Pi. The abscissa is the smaller-window average Mb, while the ordinate is the activity level Md. If Mb is less than the product of some constant k1 and the larger-window average Ma, then the pixel of interest is considered to be associated with a (no signal) background region 31, and its output value Po is computed in accordance with the following function:

$$Po = Pi - A1|Ma - Mb|, \quad (2)$$

where Po is the output pixel value, Pi is the input pixel value, and A1 is an independent reduction factor—a constant (which may be equal to 0). If a pixel lies is the background region 31, the application of equation (2) tends to drive the pixel value farther into the background region. That is, in the case of a typical microfilm image, where the lighter areas (which, in this case, have lower numerical values) represent background, the processing of pixels by equation (2) causes light valued background pixels to become even lighter in the output image.

On the other hand, if the local window average Mb associated with the input pixel value Pi is larger than a second constant k2 times the larger-window average Ma, namely the pixel of interest is associated with a potential signal region 32, then that pixel's output or replacement value Po depends on what the activity level Md is around that pixel. If the activity level Md associated with the pixel of interest is greater than the general activity threshold level MD_THR, then the input pixel Pi is considered to be representative of signal and the value of the pixel is updated or replaced in accordance with the following equation:

$$Po = Pi + A2|Ma - Mb|, \quad (3)$$

where A2 is an independent constant gain factor (which may be equal to zero). Typically, the same constants are used for reduction factor A1 and gain factor A2, but this is not necessary.

Reflection reveals that the processing of an input pixel value in accordance with either of equations (2) and (3) has the effect of applying a high-pass function to the pixel value. Namely, equations (2) and (3) tend to amplify any differences between individual pixel values and the surrounding average. On the other hand, if a pixel whose smaller window average Mb exceeds k2Ma, so that it falls within region 32, but is associated with a window whose variation Md is less than the variation threshold MD_THR, the adaptive filter performs a low-pass function; that is, it replaces the input pixel value Pi with the smaller-window average Mb, which operation tends to smooth the image and de-emphasize differences between pixel values.

FIG. 3 also depicts a region 33 between Mb=k1Ma and Mb=k2Ma, which is to be subjected to a low-pass filtering operation. In region 33, in which the small-window average Mb is nearly equal to the large-window average Ma, there is essentially no general image variation around the pixel, and any significant difference between the particular pixel value under consideration and the values of the surrounding pixels should be suppressed. As a practical matter, k1 and k2 are set by the system quantization error; that is, the region between Mb=k1Ma and Mb=k2Ma represents that the local window average Mb is equal to the larger window average Ma to within the quantization error of the signal processing. (While one might similarly consider reserving for separate treatment a horizontal small-difference region around Md=MD_THR like the vertical region around Mb=Ma, I have found no particular advantage for such an scheme.) It should also be recognized that the high- and low-pass filtering equations (2) and (3) are merely exemplary, and others may be used. On the right side of equations (2) and/or (3), for example, Pi could be replaced with Mb—or vice versa—and similar (although not identical) results would be obtained.

The manner in which the activity threshold MD_THR may be computed is set forth in the flow chart of FIG. 4. As pointed out above, the activity threshold MD_THR is intended to approximate the general variation level ( or, in some embodiments, some fraction or multiple of it, perhaps with a constant added or subtracted ) in the image as a whole. Although the most accurate way to determine its level would require two passes through the image, speed as well as cost considerations in some applications make a two-pass process undesirable. As a result, a further aspect of the invention described in the above-referenced '091 application, now abandoned, involves executing an 'on-the-fly' routine that iteratively adjusts the activity threshold level MD_THR as processing of the digitized image proceeds.

The overall approach illustrated in FIG. 4 is to maintain a single value for the activity threshold MD_THR throughout an entire scan line of the digitized image array, and then automatically update the MD_THR value it at the end of the scan line in accordance with an interim variation-indicating value IMG_MD, that is iteratively adjusted on a pixel-by-pixel basis from the beginning of a respective line to the end of that line. The routine so varies IMG_MD during the line scan that the value of IMG_MD tends toward an average of the variations in the windows of those pixels whose window variations exceed an 'average low spatial frequency activity' level PREV_MD, which the routine has identified as being the average variation in certain low-spatial-frequency regions of the image.

At the beginning of each image, a first step or block 40 of process of FIG. 4 initializes the activity threshold MD_THR, as well as the two variable levels IMG_MD and PREV_MD, and a third value BG_MD, associated with a temporary low frequency activity level, which is used to update PREV_MD at the end of a line. In the illustrated process, a non-limitative choice of eight-bit resolution yields a pixel-value range of 0–255. It may be observed that the process of FIG. 4 departs from the usual flow-chart convention by depicting two parts of the routine operating in parallel.

One portion of the routine, which will be described below, begins with decision step 42, while the other portion, which is employed to establish the average activity level (i.e., variation) PREV_MD in low-frequency regions, begins with another decision block 44. Like the activity threshold MD_THR, PREV_MD is updated only at the end of each scan line. In the interim, a temporary value BG_MD, from which PREV_MD is updated, as described above, is adjusted by the part of the FIG. 4 routine that starts with step 44.

Step 44 identifies pixels that are most likely to be in low-spatial-frequency regions. For this purpose, step 44 employs as a criterion the equality of (actually, less than a quantization-error difference between) Ma and Mb, i.e., between the larger- and smaller-window averages. If the pixel under consideration meets this criterion, then the temporary low frequency activity level BG_MD is adjusted up or down slightly toward the activity level Md within that particular pixel's larger window.

Specifically, if decision step 46 determines that BG_MD exceeds Md, then BG_MD is decremented or decreased by 1/100 of its value in step 48. Thus step 48 must be repeated one hundred times to change BG_MD by one unit at the pixel-value resolution. If the value of BG_MD does not exceed Md, it is incremented or increased by 1/100 in step 50. Such an adjustment of BG_MD occurs for every pixel that meets the criterion of step 44. At the end of a respective scan line, the average low-frequency-region activity-level value PREV MD is updated in step 52 to the current value of BG_MD. This average low frequency activity level value PREV_MD is used in the first step 42, of the other parallel routine.

Decision step 42 compares the current pixel's activity level Md with the low-frequency-region activity level PREV_MD. If the current pixel's activity level Md is not at least equal to that low-frequency-region activity level PREV_MD, then the value of the variation within the current pixel's window will not be used to affect the activity threshold MD_THR, and the process proceeds to step 62. Otherwise, the temporary-value variable IMG_MD, from which the activity-level threshold MD_THR is updated, is adjusted slightly up or down toward the variation Md within the current pixel's window, as shown by steps 54, 56, and 60.

At the end of a scan line (decision step 62), the activity threshold MD_THR is adjusted in accordance with the equation of step 64. As shown in step 64, the activity threshold MD_THR is essentially adjusted half way from its previous value (at the end of the previous line) to the current value of IMG_MD at the end of the current line. (The "bias" represented by the "+1" in the equation of step 64 is used only to overcome an artifact of the limited-precision arithmetic used in the calculation.)

FIG. 5 is a diagrammatic illustration of a non-limitative example of signal processing circuitry that may be employed to implement the digital image signal processing routine described above in real time. A line store 66 receives the raw pixel values from the scanning device and accumulates the pixel values in a group of scan lines equal in number to the height of the larger windows. At the pixel-scan rate, it applies to average-computing circuits 68 and 70 a window's worth of pixel values for the large and small windows, respectively. These circuits compute Ma and Mb, which they apply to a subtraction circuit 72. Circuit 72 sends the magnitude part of the result—i.e., the absolute value—to two multipliers 74 and 76, which receive the high-pass-equation constants A1 and A2 from appropriate registers not shown in the drawings. The values used for these constants are not critical. A value of eight has been satisfactorily employed for both constants in a system in which the pixel values are given with eight-bit resolution.

Adders 78 and 80 respectively subtract and add these values from and to the input pixel value for the pixel currently under consideration and apply the results to a three-input multiplexer 82. At the same time, a variation-calculating circuit 84 uses the output of the line store 66 and the Ma value from averaging circuit 68 to compute the variation Md in the larger window's pixel values. From this and the line-store output, it also generates the activity threshold MD_THR. On the basis of the resulting MD_THR and Md values and of an output of subtraction circuit 72 that indicates whether Mb is greater than, equal to, or less than Ma, a classifier 86 classifies the current pixel in accordance with the FIG. 3 scheme and applies to multiplexer 82 a select signal that represents the FIG. 3 class to which the pixel currently under consideration belongs. Multiplexer 82 then selects among the (low-pass) Mb value from the averaging circuit 70 and the two high-pass-filter outputs from adders 78 and 80 to produce the proper replacement pixel value. As pointed out in my earlier filed '091 application, in the embodiment illustrated in FIG. 5, classifier 86 may additionally supply its output to quantizer 22, if that quantizer is of the type described in my co-pending U.S. patent application Ser. No. 757091, filed Sep. 10, 1991, now abandoned, for "Spatially Variant Filtering System," assigned to the assignee of the present application and the disclosure of which is herein incorporated.

Although the above-described selective/adaptive filtering mechanism of my co-pending '091 application, now abandoned, offers a significantly improvement over prior art approaches of exclusively using either low-pass spatial filtering or highpass spatial filtering to process digital images, I have developed modifications that may be incorporated in the highpass filter and activity level thresholding mechanisms of the system, which enable the adaptive filter to provide a still further enhanced output digital image.

SUMMARY OF THE INVENTION

More particularly, I have discovered that a further improvement in signal-to-noise ratio in the high pass filtering operation may be obtained by refining the gain factor which is used to define the value of pixel that has been classified as an image signal. I have also developed a mechanism for more accurately updating the activity threshold level MD_THR that effectively prevents discontinuities or 'jumps' in the threshold level during its 'on-the-fly', line-by-line adjustment, thereby enhancing both the highpass and low-pass filtering operations, and which take into account how 'noisy' the background is. In addition, I have remedied the problem of potential corruption of the local mean window by an edge portion of the image by requiring that pixels which are associated with background or signal regions of the image be respectively less than or greater than the local mean window value Mb. Otherwise the pixel values are not modified.

Pursuant to a first aspect of the improvement offered by the present invention, I have modified that portion of the adaptive spatial filter mechanism which selectively performs spatial high pass filtering of an input digital signal to produce an output pixel value having an enhanced signal level. The improved adaptive spatial filter mechanism is operative to produce an output pixel value using a variable gain factor that effects a variable degree of enhancement of the input pixel.

The variable degree of enhancement is defined in accordance with the product of a variable gain factor G and the magnitude of the difference between the value Pi of the input pixel and the large window average Ma containing the input pixel. The variable gain factor G, which represents the variable degree of enhancement of the input pixel, corresponds to the minimum of: 1) a fixed gain value g (an independent constant corresponding to maximum desired gain); and 2) a variable gain value. The magnitude of the variable gain value is defined as the square of the ratio of the variation in spatial activity content Md within the image window containing the pixel and the adjustable threshold level MD_THR established at the end of the previous line of the image being processed.

The variable gain factor of the present invention effectively makes the gain dependent upon how close the activity level of a pixel of interest is to the threshold, so that pixels whose activity values are close to or only slightly above the threshold will be emphasized significantly less than pixels whose associated activity values are substantially above the threshold. This graduated gain scale effects a 'softer' emphasis of image variations that do not possess strong signal amplitudes, while providing a 'harder' emphasis of high amplitude signal values, thereby improving the signal-to-noise ratio of the pixel-representative signals output from the high pass filter.

In accordance with a second aspect of the present invention, I have modified that portion of the adaptive spatial filter mechanism which updates the value of the adaptive activity threshold level MD_THR through which pixel values are classified as signal pixels, as described above. I selectively update the threshold at the end of each line, rather than automatically update the threshold, as described in the '091 application. This selective updating is based upon prescribed spatial activity criteria, which effectively prevents discontinuities or 'jumps' in the threshold level during its 'on-the-fly', line-by-line adjustment, thereby enhancing both the high-pass and low-pass filtering operations and so as to make the threshold level change dependent upon how 'noisy' the background is.

In accordance with the improved adaptive threshold level updating mechanism, the adaptive filter is operative to generate, for each successive line of the input digital image to be processed, a respective 'prospective' threshold level TEMP_THR, in accordance with the contents of that each successive line (y) of the input image. For a respective line of the input image, the adaptive spatial filter mechanism is further operative to selectively employ either its prospective threshold level TEMP_THR, or the previous threshold level MD_THR$_{y-1}$ as the adjustable threshold level in dependence upon a prescribed difference in contents of the respective image line (y) and another line (two previous lines back (y-2)).

In particular, the adaptive spatial filter mechanism is operative to employ the prospective threshold level in response to a prescribed difference between the threshold level of the line two lines back and the activity level parameter of the line of interest being less than a predetermined fraction (e.g. one-fourth) of the threshold level of the previous line.

The adaptive spatial filter mechanism is also operative to selectively employ either the 'prospective' threshold level TEMP_THR or the previous threshold level MD_THR$_{y-1}$ as the adjustable threshold level, in dependence upon a predetermined relationship between the previous threshold level MD_THR$_{y-1}$ and a background level BG_MD$_{x,y-1}$ of the previous line.

The prospective threshold level TEMP_THR itself is defined in accordance with a prescribed combination of the threshold level MD_THR$_{y-1}$ of the previous line and an activity level parameter IMG_MD representative of the spatial variation of pixels located in a region other than a low spatial frequency region of the digital input image. If the threshold level of the previous line is no greater than the low frequency activity level parameter, the adaptive spatial filter mechanism uses the prospective threshold level as the new activity threshold level for the line of interest. On the other hand, if the threshold level of the previous line is greater than the low frequency activity level parameter, there is no change in the threshold level; namely the adaptive spatial filter mechanism uses the same threshold level that is used to process pixels of the previous line.

In accordance with a third aspect of the present invention, if the value of Mb for the pixel of interest is less than the product of k1 and the larger-window average Ma, so that the pixel apparently falls in a background region, an additional requirement for classifying the pixel as lying in the background region (so that its output value Po is to be computed in accordance with equation (2) supra) is that the value of the input pixel Pi must be less than Mb. Otherwise the pixel is not modified. Similarly, if the local window average Mb associated with the input pixel value Pi is larger than the product of the second constant k2 times the larger-window average Ma, so that the pixel of interest is apparently associated with a potential signal region, then, in addition to requiring that the activity level Md associated with the pixel be greater than the general activity threshold level MD_THR, it also necessary that the value of the input pixel Pi be greater than Mb, in order for the output pixel value Po to be calculated in accordance with the variable gain mechanism, described briefly above. Otherwise the pixel is not changed. These two additional requirements ensure that at those regions of the image where there is an edge or border of the image area, which would appear to be signal, the intrusion of the edge into the window Mb during the course of a line scan will not dominate the pixel classification discrimination function and cause an unwanted 'halo' effect adjacent to the image border.

BRIEF DESCRIPTION OF THE DRAWINGS

FIG. 1 is a block diagram of a digital imaging processing system including an adaptive filter for selectively performing low-pass and high-pass filtering of a digital image;

FIG. 2 depicts large and local average pixel value windows.

FIG. 6 is a modification of the graphical representation of a classification scheme of FIG. 3, showing a distribution of activity levels relative to threshold level MD_THR;

DETAILED DESCRIPTION

As set forth briefly above, in accordance with a first aspect of the present invention, that portion of the adaptive spatial filter which selectively performs spatial high pass filtering of an input digital signal uses a variable gain factor is dependent upon how close or how far above the activity level of a pixel of interest is to the activity level threshold MD_THR for the input image line of interest. Pixels whose associated activity values Md are close to or only slightly above the threshold level will be emphasized significantly less than pixels whose associated activity values are substantially above the threshold. Namely, this graduated gain scale effects a 'softer' emphasis of image variations that do not possess strong signal amplitudes, while providing a 'harder' emphasis of high amplitude signal values, thereby improving the signal-to-noise ratio of the pixel-representative signals output from the high pass filter.

Figure 3:
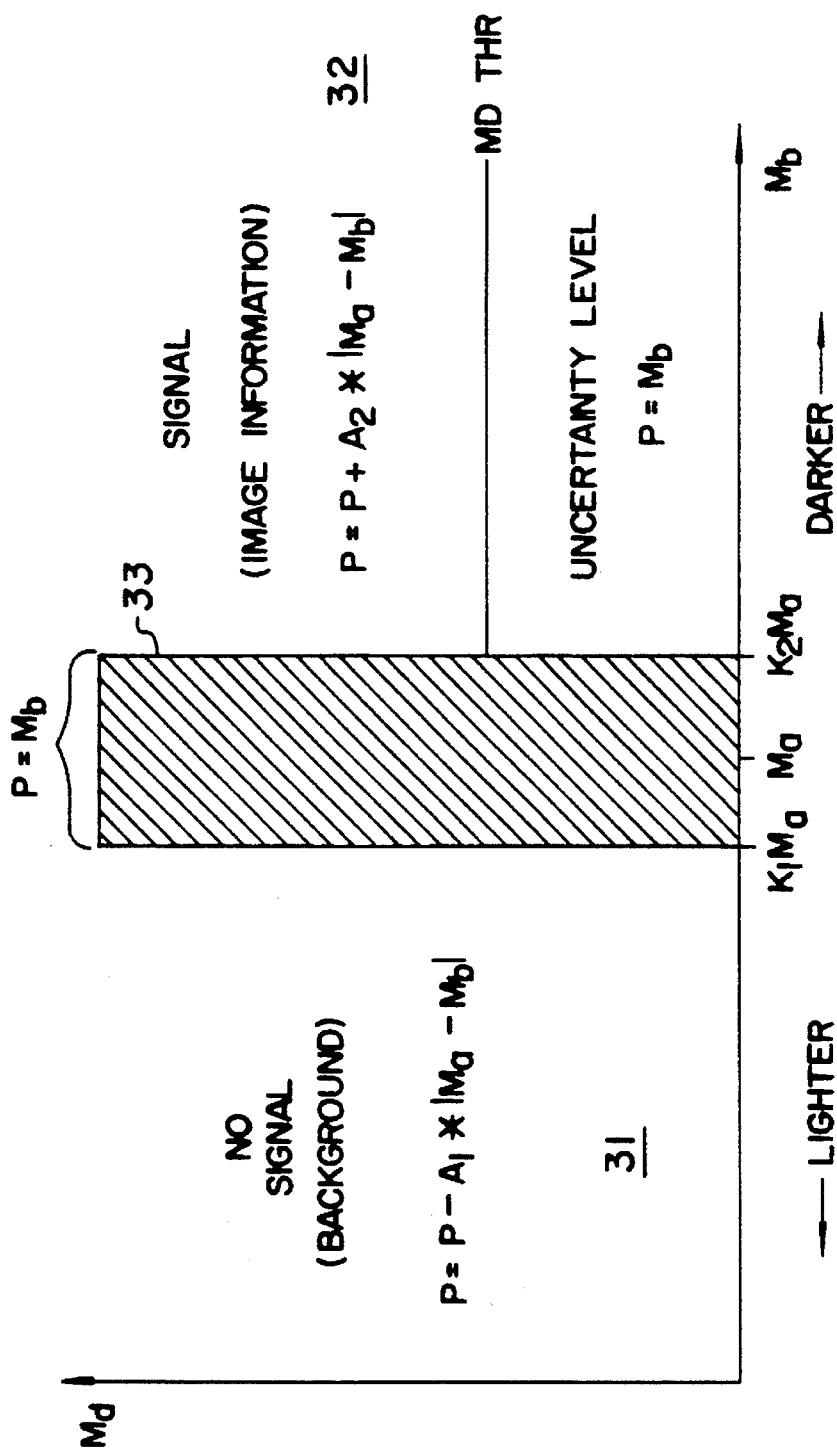
FIG. 3 is a graphical representation of a classification scheme employed in an embodiment of the invention described in my above-referenced '091 application, now abandoned.

To illustrate the manner in which the variable gain mechanism of the present invention applies differential signal value enhancement gains to pixels having respectively different activity levels Md, attention may be directed to FIG. 6, which shows an illustrative set or group of activity levels Md1, Md2 and Md3 located in 'signal' region 32 of the graphical representation of a classification scheme of FIG. 3, described above.

As pointed out previously in .connection with the description of FIG. 3, if the local average Mb of the input pixel value Pi of interest is larger than a second constant k2 times the larger-window average Ma, namely the pixel of interest is associated with a potential signal region 32, then that pixel's output or replacement value Po depends on what the activity level Md is around that pixel. If the activity level associated with the pixel of interest is greater than the general activity threshold level MD_THR, the pixel is considered to be representative of signal and the value of the pixel is updated or replaced by an emphasized pixel value.

Pursuant to the invention, rather than employ a fixed or constant gain factor in equation (3) supra, to determine the emphasized pixel value, the gain factor is made dependent upon the magnitude of that pixel's activity level relative to the activity threshold level MD_THR. For the illustrative set of activity levels Md1, Md2 and Md3 located in 'signal' region 32, activity level Md1 is relatively close to or just above activity threshold level MD_THR, and activity level Md2 is slightly above activity level Md1. Because of the close proximity of activity level Md1 to the threshold level MD_THR, it cannot clearly be inferred that its associated pixel value is true signal; it lies close enough to the uncertainty region as to potentially contain noise, which, ideally, should not be emphasized.

To avoid significant emphasis of potential noise for a pixel having an activity level in closed proximity to the threshold level, such as in the case of activity level Md1 in FIG. 6, the gain factor is caused to have a relatively low value, such as only slightly greater than unity. On the other hand for pixels having relatively large valued activity levels such as activity level Md3, which lies well above threshold MD_THR, the gain factor is increased, to provide the requisite emphasis to the output pixel value Po.

Pursuant to the invention, the variable gain factor $G_{xy}$ employed in equation (3) for a pixel $Po_{xy}$ of interest is preferably defined in accordance with the product of a variable gain factor $G_{xy}$ and the magnitude of the difference between the value $Pi_{xy}$ of the input pixel and the large window average Ma containing the input pixel. The variable gain factor, which represents the variable degree of enhancement of the input pixel $Pi_{xy}$, corresponds to the minimum of: 1) a fixed gain value g (an independent constant corresponding to maximum desired gain); and 2) a variable gain value. The magnitude of the variable gain value is defined as the square of the ratio of the variation in spatial activity content Md within the image window containing the pixel and the adjustable threshold level MD_THR established at the end of the previous line of the image being processed. In particular the variable gain factor $G_{xy}$ is defined as:

$$G_{xy} = MIN\{g, (Md_{xy}/MD\_THR_{y-1})^2\} \quad (4)$$

where g is an independent constant (maximum desired gain).

The output value $Po_{xy}$ of an input pixel $Pi_{xy}$ of interest is defined as:

$$Po_{xy} = P_{xy} + g*|Ma_{xy} - Pi_{xy}| \text{ if } MD\_THR_{y-1} \leq k \quad (5)$$

$$Po_{xy} = P_{xy} + G_{xy}*|Ma_{xy} - Pi_{xy}| \text{ otherwise} \quad (6)$$

where k is a constant.

From the foregoing expressions, it will be appreciated that pixels whose associated activity values, such as Md1 and Md2 in FIG. 6, are close to or only slightly above the threshold level MD_THR will be emphasized significantly less than pixels whose associated activity values, such as Md3, are substantially above the threshold level MD_THR. Like equation (3), the pixel emphasis mechanism of equations (4)–(6) has the effect of amplifying any differences between individual pixel values and the surrounding average. However, the graduated gain scale of equations (4)–(6) effects a 'softer' emphasis of image variations that do not possess strong signal-amplitudes, while providing a 'harder' emphasis of high amplitude signal values, thereby improving the signal-to-noise ratio of the pixel-representative signals output from the high pass filter.

The second aspect of the present invention involves a mechanism for updating the activity threshold level MD_THR so as to effectively prevent discontinuities or 'jumps' in the threshold level during its 'on-the-fly', line-by-line adjustment, thereby enhancing both the high-pass and low-pass filtering operations. It also tracks the background, so as to make the threshold level change dependent upon how 'noisy' the background is. Namely, rather than automatically update the activity threshold level MD_THR at the end of each line, as described above with respect to the mechanism set forth in the '091 application, the activity threshold level is updated at the end of each line selectively, based upon prescribed spatial activity criteria.

More particularly, as described earlier with reference to FIG. 4, the routine for updating activity threshold level MD_THR in the invention of the '091 application, now abandoned, involves maintaining a single value for the activity threshold MD_THR throughout a respective scan line of the digitized image array, and then, at step 64 at the end of the scan line, automatically updating the MD_THR value in accordance with an interim variation-indicating value IMG_MD, that has been iteratively adjusted on a pixel-by-pixel basis from the beginning of the scan line to the end of that line. The routine of FIG. 4 varies IMG_MD during the line scan, so that the value of IMG_MD tends toward an average of the variations in the windows of those pixels whose window variations exceed an 'average low spatial frequency activity' level PREV_MD that the routine has identified as being the average variation in certain low-spatial-frequency regions of the image. In the activity threshold level-updating step 64, the activity threshold level MD_THR is effectively adjusted half way from its previous value (at the end of the previous line) to the current value of IMG_MD at the end of the current line.

Figure 4:
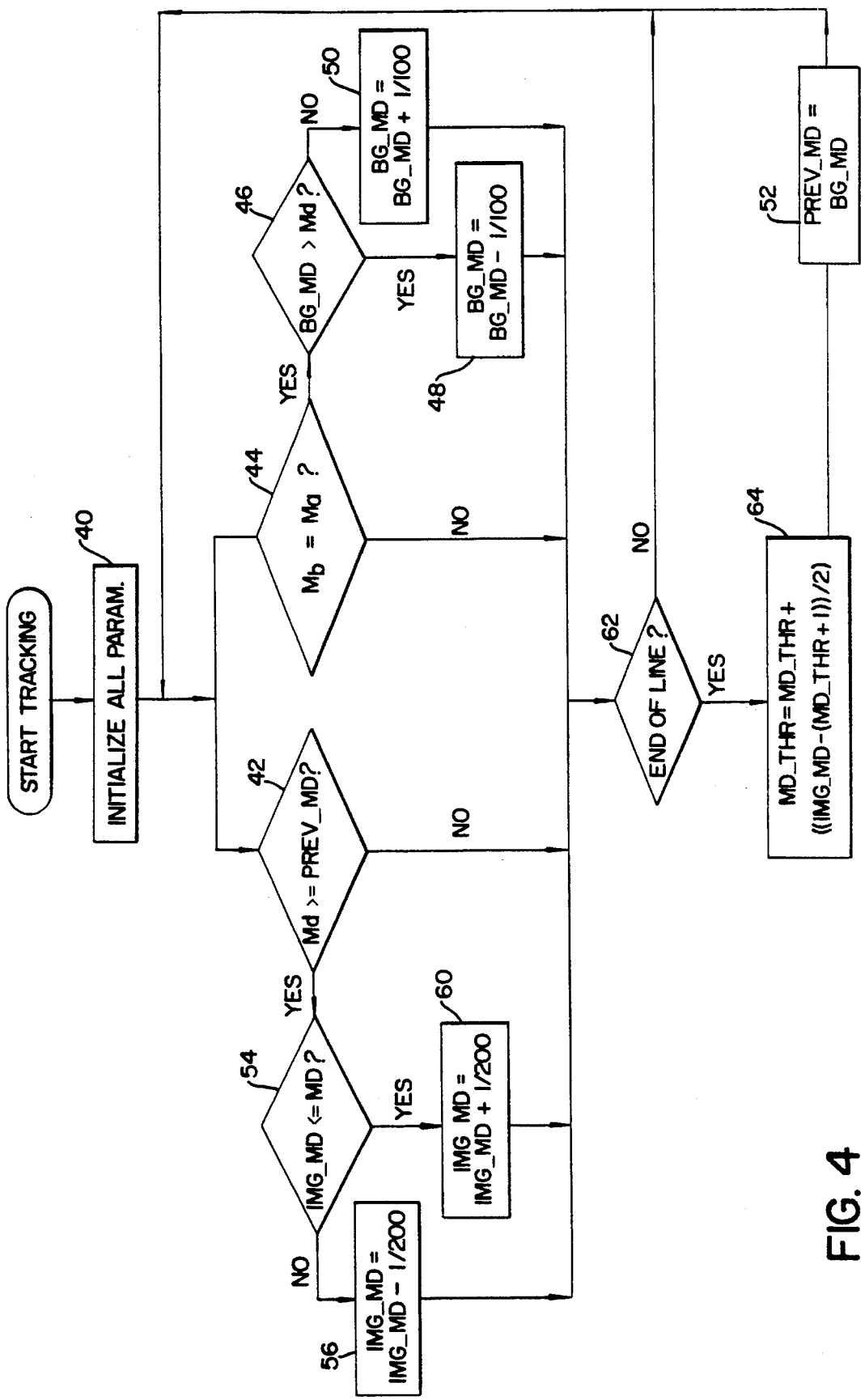
FIG. 4 is a flow chart of the routine for determining the activity-level threshold used in the classification scheme of FIG. 3.
Figure 7A:
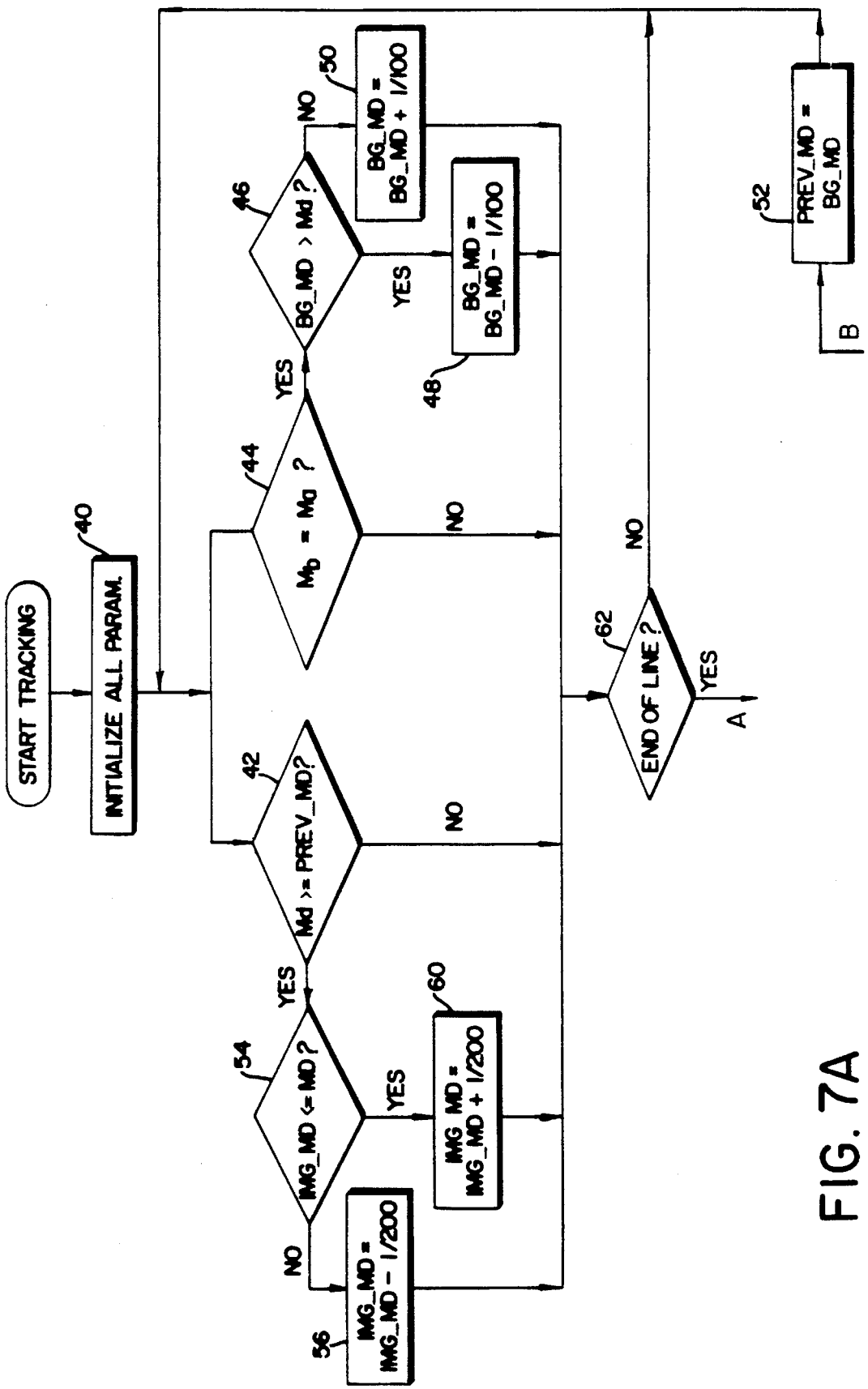
FIG. 7A–7B show a modified flow chart of the routine of FIG. 4 for determining the activity-level threshold used in the classification scheme of FIG. 6 in accordance with the improvement of the present invention.
Figure 7B:
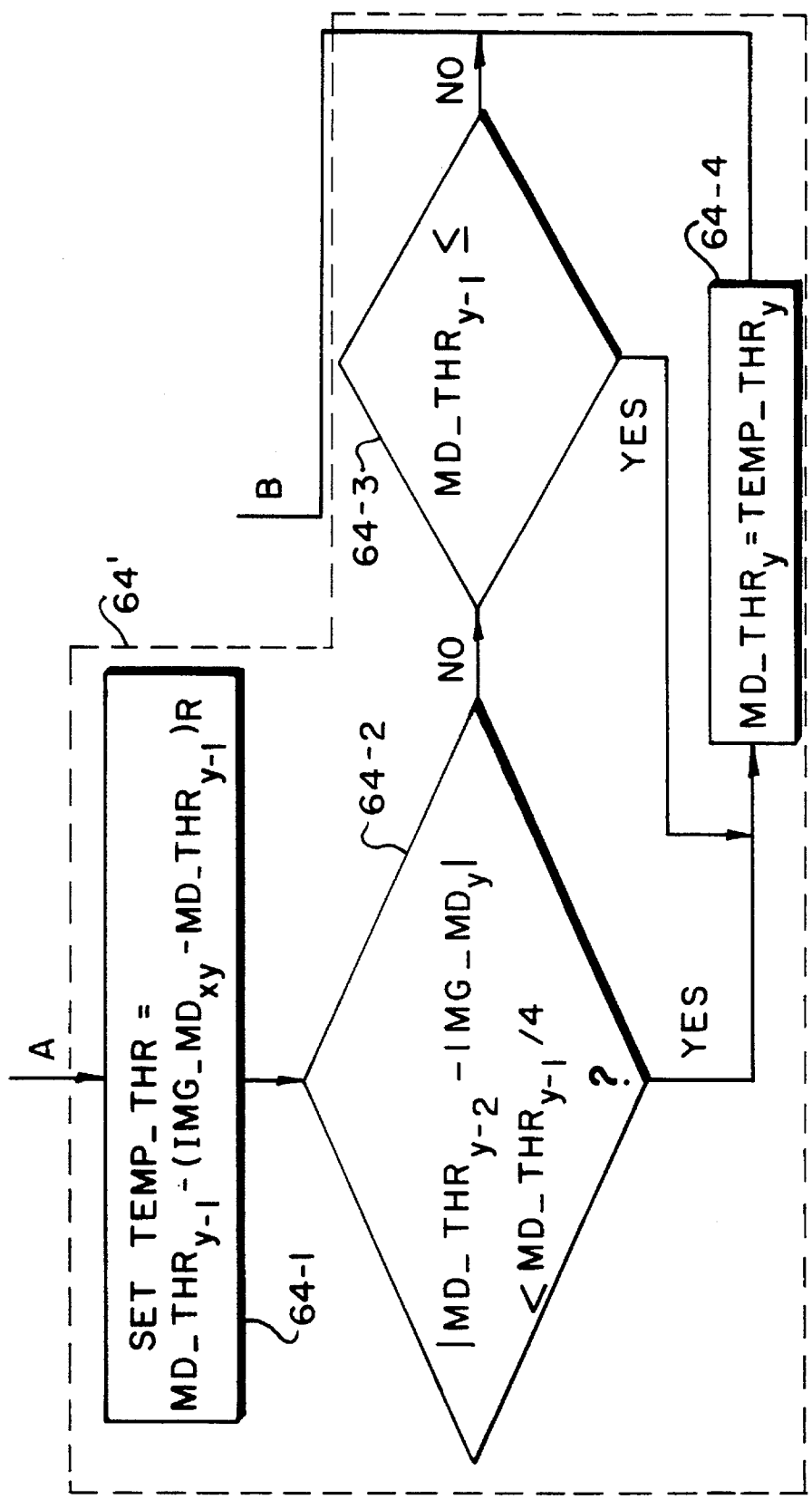

In accordance with the selective updating mechanism of the present invention, the routine of FIG. 4 is modified as shown in FIG. 7, wherein the activity threshold level updating step (64 in FIG. 4) is replaced by updating subroutine 64' which comprises a plurality of steps 64-1–64-4, that operate to 'selectively' change or retain activity threshold level MD_THR in dependence upon prescribed spatial activity criteria.

Referring to FIG. 7, at the end of successive line in preparation for the processing of pixels of the next line of the input digital image to be processed, a 'prospective' threshold level TEMP_THR is calculated, as shown at step 64-1. The value of prospective threshold level TEMP_THR is defined essentially in accordance with the calculation set forth in block 64 of FIG. 4, namely:

$$TEMP\_THR = MD\_THR_{y-1} + (IMG\_MD_{x,y} - MD\_THR_{y-1} - 1)/2 \quad (7)$$

Whether the current value of the activity threshold level, i.e. that employed for the previous line y-1 is to be updated to the prospective threshold level TEMP_THR, or is to remain unchanged at the previous threshold level MD_THR$_{y-1}$ two image content comparisons are carried out, as shown at steps 64-2 and 64-3.

In step 64-2, the routine determines whether the absolute value of the difference between the threshold level of another line (the line two lines back (y-2)) and the activity level parameter of the line of interest (y) is less than a predetermined percentage or fraction (e.g. one-fourth) of the threshold level of the previous line (y-1). Namely, step 64-2 inquires whether $$|MD\_THR_{y-2} - IMG\_MD_y| < (MD\_THR_{y-1})/4 \quad (8)$$

If the answer to the inquiry in step 64-2 is YES, indicating a relatively small of gradual variation in activity level then the routine proceeds to step 64-4, which updates the current value of MD_THR to the prospective value TEMP_THR. After the update in step 64-4 the routine proceeds directly to step 52. If the answer to the inquiry in step 64-2 is NO, the routine proceeds to step 64-3, which inquires whether the current value of MD_THR is no greater than the temporary low frequency activity level BG_MD$_{x,y-1}$. The purpose of step 64-3 is to track the level of the background, and make a determination of whether the prospective threshold level TEMP_THR or the previous threshold level MD_THR$_{y-1}$ should be used in dependence upon a predetermined relationship between the current threshold level MD_THR$_{y-1}$ and background level BG_MD$_{x,y-1}$.

If the answer to the inquiry in step 64-3 is YES, indicating a noisy background and the need to adjust the activity level, the routine proceeds to step 64-4, which updates the current value of MD_THR to the prospective value TEMP_THR. If the answer to the inquiry in step 64-3 is NO, the current value of MD_THR is not to be updated, so the routine proceeds directly to step 52.

As noted above, pursuant to a third aspect of the present invention, the use of equations (2) and (4–6) to calculate the output pixel value as a background pixel or a signal pixel, respectively, additionally depends upon whether the value of the input pixel Pi is less than or greater than the value of Mb. If the value of Mb for the pixel of interest is less than the product of k1 and the larger-window average Ma, so that, as shown in FIG. 6, the pixel is considered to be associated with the background region, then in order for its output value Po to be reduced according to equation (2), it is also necessary that the value of the input pixel Pi be less than Mb. If the pixel value is less than Mb, then its value is not changed (reduced in accordance with equation (2)). Similarly, if the local window average Mb associated with the input pixel value Pi is larger than the product of the second constant k2 times the larger-window average Ma, so that the pixel of interest is apparently associated with a potential signal region, in addition to requiring that the activity level Md associated with the pixel be greater than the general activity threshold level MD_THR, the value of the input pixel Pi must also be greater than Mb, in order for the output pixel value Po to be 'boosted' (calculated in accordance with equations (4–6)). If the value of such a pixel is not greater than Mb, it's value remains unchanged. These two additional requirements ensure that at edge regions of the image area, which appear to be signal, the intrusion of the edge into the local activity window Mb during the course of a line scan will not erroneously dominate the pixel classification discrimination function and create a smearing/boosting of a several pixel width portion of the image so as to form an unwanted 'halo' along the perimeter of the image.

Figure 5:
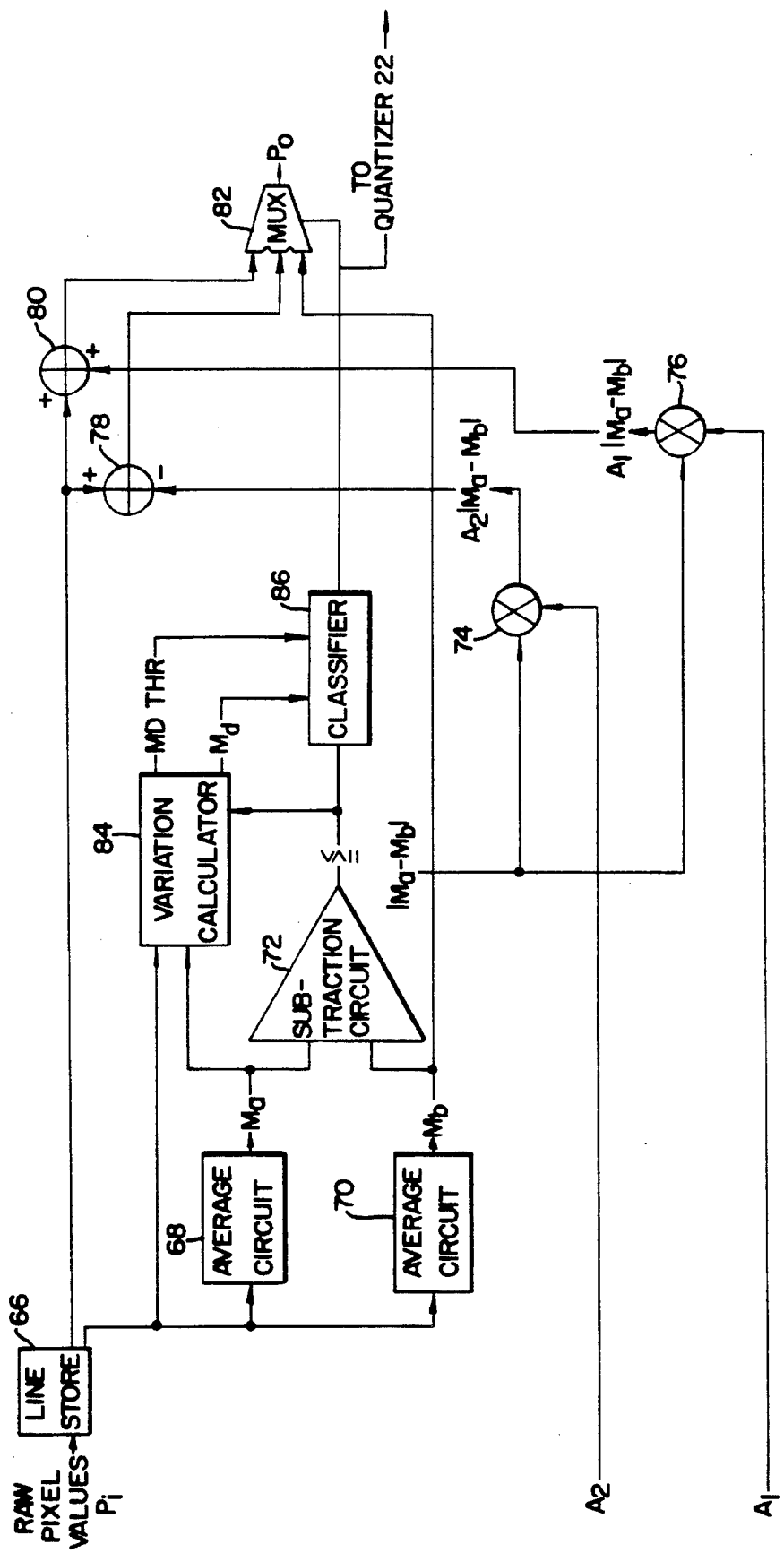
FIG. 5 is a diagrammatic illustration of a non-limitative example of signal processing circuitry that may be employed to implement the digital image signal processing routine described in my above-referenced co-pending '091 application.
Figure 8:
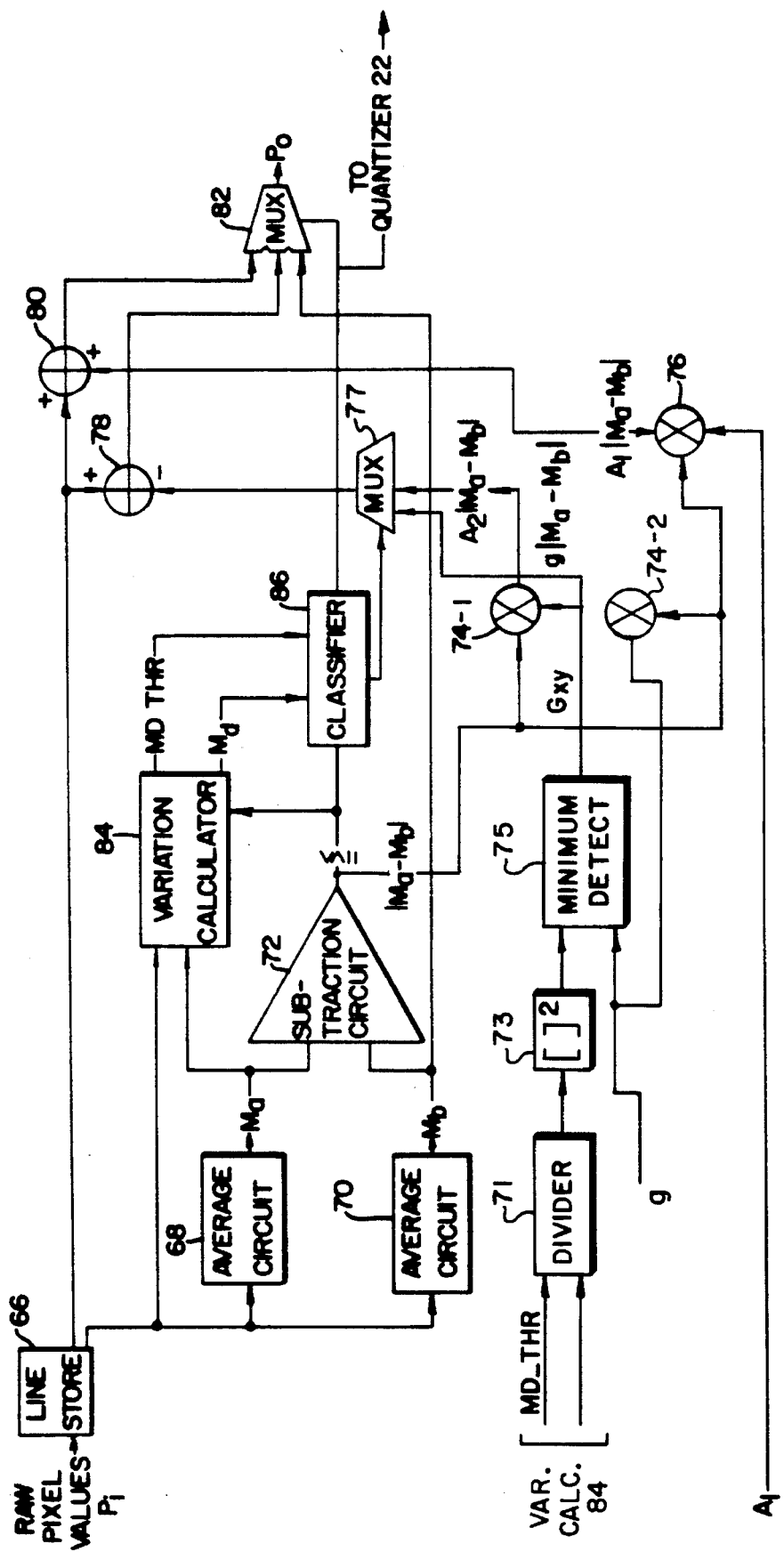
FIG. 8 is a diagrammatic illustration of a modification of the signal processing circuitry of FIG. 5 that may be employed to implement the improved digital image signal processing routine of the present invention.

FIG. 8 is a diagrammatic illustration of a non-limitative example of a modification of the signal processing circuitry of FIG. 5 that may be employed to implement the improved digital image signal processing routine described above in real time. The modification embodies the addition of a divider 71 to which the outputs of variation calculator 84 are applied, to obtain the ratio (Md/MD_THR). The output of divider is applied to squaring circuit 73 which produces the squared the ratio (Md/MD_THR)$^2$. The output of squaring circuit 73 is applied as one input of a minimum detector 75, to a second input of which the fixed, maximum desired gain constant g is applied. Fixed gain constant is also applied to one input of multiplier 74-1, which corresponds to multiplier 74 in FIG. 5. The minimum value of the two inputs to minimum detector 75, which corresponds to the variable gain factor G, as described above, is output by detector 75 to multiplier 742. Each of multipliers 74-1 and 74-2 is coupled to receive the output , |Ma–Mb| from substraction circuit 72. The outputs of multipliers 74-1 and 74-2 are applied as inputs to multiplexer 77, the select input of which is controlled by classifier 86. The output of multiplexer 77 is coupled as an input to difference circuit 78.

As explained previously in connection with the description of FIG. 5, difference circuit 78 and adder 80 respectively subtract and add these values from and to the input pixel value for the pixel currently under consideration and apply the results to multiplexer 82. At the same time, a variation-calculating circuit 84 uses the output of the line store 66 and the Ma value from averaging circuit 68 to compute the variation Md in the larger window's pixel values.

From this and the line-store output, it also generates the activity threshold MD_THR. On the basis of the resulting MD_THR and Md values and of an output of subtraction circuit 72 that indicates whether Mb is greater than, equal to, or less than Ma, a classifier 86 classifies the current pixel in accordance with FIG. 6 scheme and applies to multiplexer 82 a select signal that represents the FIG. 6 class to which the pixel currently under consideration belongs. Multiplexer 82 then selects among the (low-pass) Mb value from the averaging circuit 70 and the two high-pass-filter outputs from difference circuit 78 and adder 80 to produce the proper replacement pixel value Po. Again, as pointed out above, classifier 86 may also supply its output to quantizer 22, if the quantizer is of the type described in my co-pending previously referenced U.S. patent application Ser. No. 757091, filed Sep. 10, 1991, now abandoned, for "Spatially Variant Filtering System."

As will be appreciated from the foregoing description, the improved adaptive filter of the present invention provides an enhancement of the signal-to-noise ratio in the filter's high pass filtering operation by refining the gain factor that is used to define the value of pixel that has been classified as an image signal. In addition, by more accurately tracking low frequency background activity, the filter is able to selectively adapt the activity threshold level MD_THR to a value that effectively prevents discontinuities or 'jumps' in the threshold level during line-by-line adjustment, and takes into account how 'noisy' the background is. Finally, potential corruption of the Mb window by an edge portion of the image is avoided by requiring that pixels which are associated with background or signal regions of the image be respectively less than or greater than the local mean window value Mb. Otherwise the pixel values are not modified.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of processing an input digital image containing an array of input pixels having associated digital input signals which are to be processed to produce digital output signals representative of the values of output pixels of an enhanced output digital image, said method comprising the steps of:

(a) providing an adaptive spatial filter mechanism which selectively performs spatial high pass filtering of successive portions of an input digital signal associated with a respective input pixel of an input digital image in accordance with a first prescribed relationship between a variation in spatial activity content within an image window containing said input pixel and an adjustable threshold level;

(b) applying a digital input signal to the adaptive filter mechanism provided in step (a), so as to produce a digital output signal associated with a respective output pixel of said output digital image; and wherein said adaptive spatial filter mechanism is operative to selectively adjust said adjustable threshold level to a new threshold level for each of said successive portions of said input digital image in accordance with the contents of a respective portion of said digital input image being processed, and wherein, for each successive portion of said input digital image to be processed, said adaptive spatial filter mechanism is operative to generate a respective prospective threshold level in accordance with the contents of said each successive portion of said digital input image being processed, and wherein, for a respective one of said successive portions of said input digital image, said adaptive spatial filter mechanism is operative to selectively employ either its prospective threshold level or the previous threshold level as said adjustable threshold level in dependence upon a prescribed difference in contents of said respective one of said successive portions of said input digital image and another of said successive portions of said image.

2. A method according to claim 1, wherein, for a respective one of said successive portions of said input digital image to be processed, said adaptive spatial filter mechanism is operative to generate said respective prospective threshold level in accordance with a prescribed combination of the threshold level of a previous one said successive portions of said input digital image and an activity level parameter representative of the spatial variation of pixels located in a region other than a low spatial frequency region of said digital input image, and wherein, for said respective one of said successive portions of said input digital image, said adaptive spatial filter mechanism is operative to selectively employ either its prospective threshold level or the threshold level of said previous one said successive portions of said input digital image, in dependence upon a prescribed difference between the threshold level of another of said successive portions of said input digital image and said activity level parameter of said respective one of said successive portions of said input digital image.

3. A method according to claim 2, wherein said adaptive spatial filter mechanism is operative to employ said prospective threshold level in response to said prescribed difference between the threshold level of another of said successive portions of said input digital image and said activity level parameter of said respective one of said successive portions of said input digital image being less than a predetermined fraction of the threshold level of said previous successive portion of said input digital image.

4. A method according to claim 3, wherein said adaptive spatial filter mechanism is operative to employ said prospective threshold level in response to said prescribed difference between the threshold level of another of said successive portions of said input digital image and said activity level parameter of said respective one of said successive portions of said input digital image being less than one-fourth of the threshold level of said previous successive portion of said input digital image.

5. A method of processing an input digital image containing an array of input pixels having associated digital input signals which are to be processed to produce digital output signals representative of the values of output pixels of an enhanced output digital image, said method comprising the steps of:

(a) providing an adaptive spatial filter mechanism which selectively performs spatial high pass filtering of successive portions of an input digital signal associated with a respective input pixel of an input digital image in accordance with a first prescribed relationship between a variation in spatial activity content within an image window containing said input pixel and an adjustable threshold level;

(b) applying a digital input signal to the adaptive filter mechanism provided in step (a), so as to produce a digital output signal associated with a respective output pixel of said output digital image; and wherein said adaptive spatial filter mechanism is operative to selectively adjust said adjustable threshold level to a new threshold level for each of said successive portions of said input digital image in accordance with the contents of a respective portion of said digital input image being processed, and wherein, for each successive portion of said input digital image to be processed, said adaptive spatial filter mechanism is operative to generate a respective prospective threshold level in accordance with the contents of said each successive portion of said digital input image being processed, and wherein, for a respective one of said successive portions of said input digital image, said adaptive spatial filter mechanism is operative to selectively employ either its prospective threshold level or the previous threshold level as said adjustable threshold level in dependence upon a predetermined relationship between the adjustable threshold level of another of said successive portions of said input digital image and background level of said another of said successive portions of said input digital image.

6. A method according to claim 5, wherein, for a respective one of said successive portion of said input digital image to be processed, said adaptive spatial filter mechanism is operative to generate said respective prospective threshold level in accordance with a prescribed combination of the threshold level of a previous one said successive portions of said input digital image and an activity level parameter representative of the spatial variation of pixels located in a region other than a low spatial frequency region of said digital input image, and wherein, for said respective one of said successive portions of said input digital image, said adaptive spatial filter mechanism is operative to selectively employ either its prospective threshold level or the threshold level of said previous one said successive portions of said input digital image, in dependence upon whether the threshold level of said previous one of said successive portions of said input digital image is no greater than a low frequency activity level parameter representative of the low frequency spatial variation of pixels located in a low spatial frequency region of said digital input image.

7. A method according to claim 6, wherein said adaptive spatial filter mechanism is operative to employ its prospective threshold level in response to the threshold level of said previous one of said successive portions of said input digital image being no greater than said low frequency activity level parameter.

8. A method according to claim 6, wherein said adaptive spatial filter mechanism is operative to employ the threshold level of said previous one of said successive portions of said image in response to the threshold level of said previous one of said successive portions of said input digital image being greater than said low frequency activity level parameter.

9. A method of processing an input digital image containing an array of input pixels having associated digital input signals which are to be processed to produce digital output signals representative of the values of output pixels of an enhanced output digital image, said method comprising the steps of:

(a) providing an adaptive spatial filter mechanism which selectively performs spatial high pass filtering of successive portions of an input digital signal associated with a respective input pixel of an input digital image in accordance with a first prescribed relationship between a variation in spatial activity content within an image window containing said input pixel and an adjustable threshold level;

(b) applying a digital input signal to the adaptive filter mechanism provided in step (a), so as to produce a digital output signal associated with a respective output pixel of said output digital image; and wherein said adaptive spatial filter mechanism is operative to selectively adjust said adjustable threshold level to a new threshold level for each of said successive portions of said input digital image in accordance with the contents of a respective portion of said digital input image being processed, and wherein said array of input pixels comprises a plurality of lines of pixels, and wherein, for each line of said input digital image to be processed, said adaptive spatial filter mechanism is operative to generate a respective prospective threshold level in accordance with a prescribed combination of the threshold level of a previous line of said input digital image and an activity level parameter representative of the spatial variation of pixels located in a region other than a low spatial frequency region of said digital input image, and wherein, for a respective line of said input digital image, said adaptive spatial filter mechanism is operative to selectively employ its prospective threshold level as said adjustable threshold level in dependence upon a prescribed difference between the threshold level of another line of said input digital image and said activity level parameter of said respective line of said input digital image, or in response to satisfaction of a predetermined relationship between the adjustable threshold level of the previous line of said input digital image and a low frequency activity level parameter representative of the low frequency spatial variation of pixels located in a low spatial frequency region of said digital input image.

10. A method according to claim 9, wherein said adaptive spatial filter mechanism is operative to employ said prospective threshold level in response to said prescribed difference between the threshold level of said another line of said input digital image and said activity level parameter of said respective line of said input digital image being less than a predetermined fraction of the threshold level of said previous line of said input digital image.

11. A method according to claim 9, wherein said adaptive spatial filter mechanism is operative to employ the threshold level of a previous line in response to said prescribed difference between the threshold level of said another line of said input digital image and said activity level parameter of said respective line of said input digital image being no less than a predetermined fraction of said threshold level of said previous line of said input digital image.

12. A method according to claim 9, wherein said adaptive spatial filter mechanism is operative to employ its prospective threshold level in response to the threshold level of said previous line of said input digital image being no greater than said low frequency activity level parameter.

13. A method according to claim 9, wherein said adaptive spatial filter mechanism is operative to employ the threshold level of said previous line of said image in response to the threshold level of said previous line of said input digital image being greater than said low frequency activity level parameter.

14. An apparatus for processing digital input signals representative of input pixels of an input digital image to produce digital output signals representative of output pixels of an enhanced output digital image comprising:

an input unit to which said digital input signals are coupled; and an adaptive spatial filter which selectively performs spatial high pass filtering of successive portions of an input digital signal associated with a respective input pixel of said input digital image in accordance with a first prescribed relationship between a variation in spatial activity content within an image window containing said input pixel and an adjustable threshold level, and wherein said adaptive spatial filter is operative to selectively adjust said adjustable threshold level to a new threshold level for each of said successive portions of said input digital image in accordance with the contents of a respective portion of said digital input image being processed, and wherein said input digital image comprises a plurality of lines of pixels and wherein, for each successive line said input digital image, said adaptive spatial filter mechanism is operative to generate a respective prospective threshold level in accordance with the contents of said each successive line, and wherein, for a respective line of said input digital image, said adaptive spatial filter mechanism is operative to selectively employ either its prospective threshold level or the previous threshold level as said adjustable threshold level in dependence upon a prescribed difference in contents of said respective one of said successive portions of said image and another of said successive portions of said image.

15. An apparatus according to claim 14, wherein, for a respective line of said input digital image, said adaptive spatial filter mechanism is operative to generate said respective prospective threshold level in accordance with a prescribed combination of the threshold level of a previous line of said input digital image and an activity level parameter representative of the spatial variation of pixels located in a region other than a low spatial frequency region of said digital input image, and wherein, for said respective line of said input digital image, said adaptive spatial filter mechanism is operative to selectively employ either its prospective threshold level or the threshold level of said previous line of said input digital image, in dependence upon a prescribed difference between the threshold level of another line of said input digital image and said activity level parameter of said respective line of said input digital image.

16. An apparatus according to claim 15, wherein said adaptive spatial filter is operative to employ said prospective threshold level in response to said prescribed difference between the threshold level of another line of said input digital image and said activity level parameter of said respective line of said input digital image being less than a predetermined fraction of the threshold level of said previous line of said input digital image.

17. An apparatus according to claim 16, wherein, for a respective line of said input digital image to be processed, said adaptive spatial filter mechanism is operative to generate said respective prospective threshold level in accordance with a prescribed combination of the threshold level of a previous line of said input digital image and an activity level parameter representative of the spatial variation of pixels located in a region other than a low spatial frequency region of said digital input image, and wherein, for said respective line of said input digital image, said adaptive spatial filter mechanism is operative to selectively employ either its prospective threshold level or the threshold level of said previous line of said input digital image, in dependence upon whether the threshold level of said previous line of said input digital image is no greater than a low frequency activity level parameter representative of the low frequency spatial variation of pixels located in a low spatial frequency region of said digital input image.

18. An apparatus according to claim 17, wherein said adaptive spatial filter mechanism is operative to employ its prospective threshold level in response to the threshold level of said previous line of said input digital image being no greater than said low frequency activity level parameter.

19. An apparatus according to claim 17, wherein said adaptive spatial filter mechanism is operative to employ the threshold level of said previous line of said input digital image in response to the threshold level of said previous line of said input digital image being greater than said low frequency activity level parameter.

20. An apparatus for processing digital input signals representative of input pixels of an input digital image to produce digital output signals representative of output pixels of an enhanced output digital image comprising:.

an input unit to which said digital input signals are coupled; and an adaptive spatial filter which selectively performs spatial high pass filtering of successive portions of an input digital signal associated with a respective input pixel of said input digital image in accordance with a first prescribed relationship between a variation in spatial activity content within an image window containing said input pixel and an adjustable threshold level, and wherein said adaptive spatial filter is operative to selectively adjust said adjustable threshold level to a new threshold level for each of said successive portions of said input digital image in accordance with the contents of a respective portion of said digital input image being processed, and wherein said input digital image comprises a plurality of lines of pixels and wherein, for each successive line said input digital image, said adaptive spatial filter mechanism is operative to generate a respective prospective threshold level in accordance with the contents of said each successive line of said digital input image, and wherein, for a respective line of said input digital image, said adaptive spatial filter mechanism is operative to selectively employ either its prospective threshold level or the previous threshold level as said adjustable threshold level in dependence upon a predetermined relationship between the adjustable threshold level of another line of said input digital image and background level of said another line of said input digital image.

21. An apparatus for processing digital input signals representative of input pixels of an input digital image to produce digital output signals representative of output pixels of an enhanced output digital image comprising:

an input unit to which said digital input signals are coupled; and an adaptive spatial filter which selectively performs spatial high pass filtering of successive portions of an input digital signal associated with a respective input pixel of said input digital image in accordance with a first prescribed relationship between a variation in spatial activity content within an image window containing said input pixel and an adjustable threshold level, and wherein said adaptive spatial filter is operative to selectively adjust said adjustable threshold level to a new threshold level for each of said successive portions of said input digital image in accordance with the contents of a respective portion of said digital input image being processed, and wherein said array of input pixels comprises a plurality of lines of pixels, and wherein, for each line of said input digital image to be processed, said adaptive spatial filter mechanism is operative to generate a respective prospective threshold level in accordance with a prescribed combination of the threshold level of a previous line of said input digital image and an activity level parameter representative of the spatial variation of pixels located in a region other than a low spatial frequency region of said digital input image, and wherein, for a respective line of said input digital image, said adaptive spatial filter mechanism is operative to selectively employ its prospective threshold level as said adjustable threshold level in dependence upon a prescribed difference between the threshold level of another line of said input digital image and said activity level parameter of said respective line of said input digital image, or in response to satisfaction of a predetermined relationship between the adjustable threshold level of the previous line of said input digital image and a low frequency activity level parameter representative of the low frequency spatial variation of pixels located in a low spatial frequency region of said digital input image.

* * * * *